UNITED STATES PATENT OFFICE.

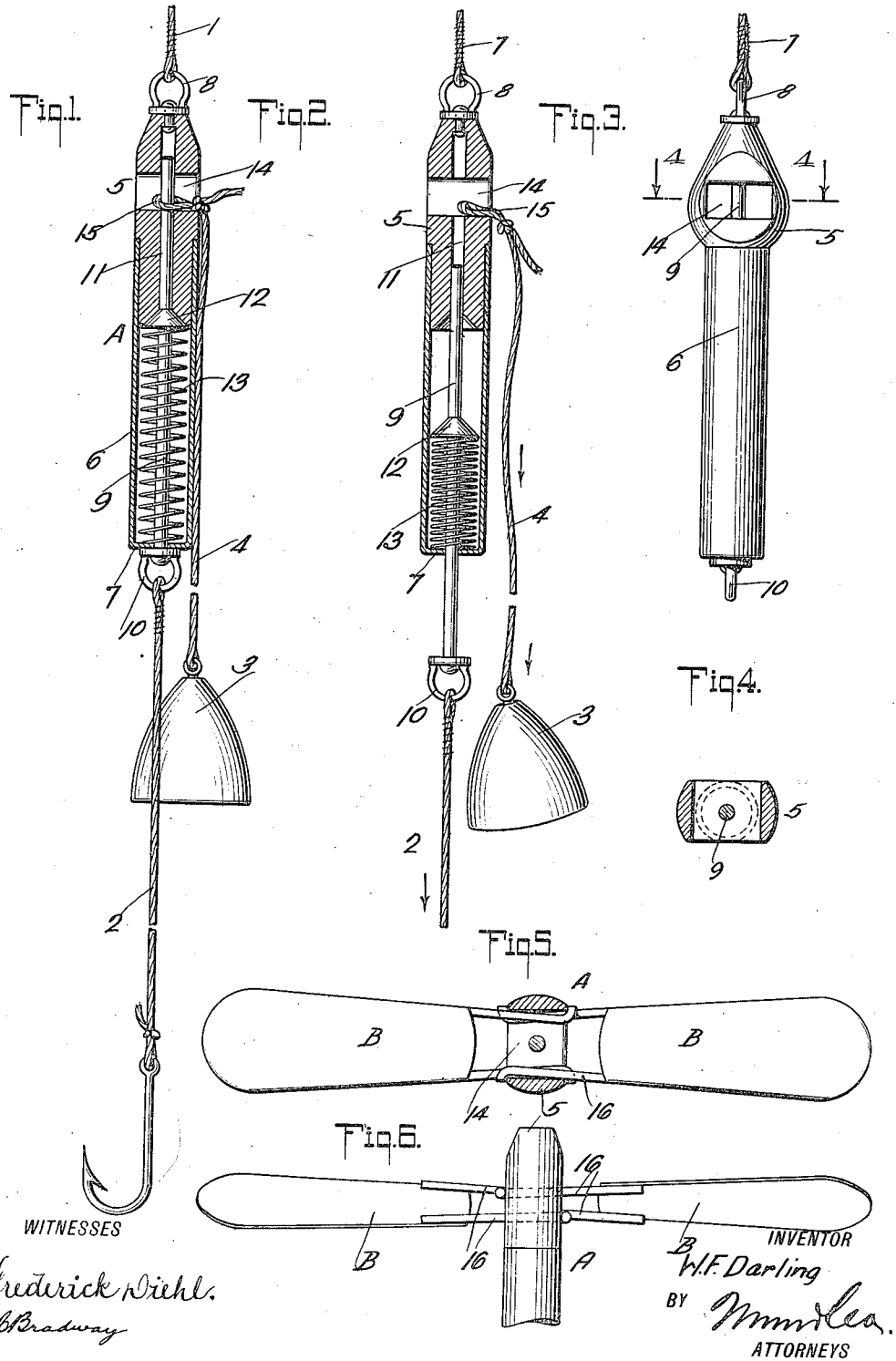

WILLIS FOREST DARLING, OF DERRY, NEW HAMPSHIRE.

FISHING-TACKLE DEVICE.

1,296,370.

Specification of Letters Patent.  Patented Mar. 4, 1919.

Application filed March 28, 1918. Serial No. 225,269.

*To all whom it may concern:*

Be it known that I, WILLIS F. DARLING, a citizen of the United States, and a resident of Derry, in the county of Rockingham and State of New Hampshire, have invented a new and Improved Fishing-Tackle Device, of which the following is a full, clear, and exact description.

This invention relates to a fishing tackle and has to deal more particularly with a device adapted to be used between the fish line and the leader, hook or hooks, whereby certain novel effects are obtained.

The invention has for its general objects to provide an improved device which can be used as an automatic release for the sinker or weight when the fish makes a bite or strike; as a shock absorber so as to protect the hook, leader, line or rod from injuring or tearing the fish's mouth when a strike or bite is made, and as a spinner when no weight or sinker is used, so as to give the appearance of a butterfly, bug or other insect, the spinner having a regular rotary motion at high speed or an irregular rotation at a low speed and with a zigzag movement of the device.

A more specific object of the invention is the provision of a fishing tackle device having a swivel connection both to the fish line and hook or leader, and which embodies an automatic release for the sinker under the weight or resistance of the fish and which provides a spring between the fish line and the hook to serve as a shock absorber, as above explained, the construction being of comparatively simple and inexpensive construction, reliable and efficient in use, and of such design as to be of light weight and of small dimensions.

Another object of the invention is to provide a freely rotatable body attached to the fish line and hook and having means for detachably and independently fastening blades thereto in a simple and effective manner so as to use the device as a single or double blade spinner.

With such and other objects in view, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a vertical section of the device with its parts in normal position and having a sinker attached thereto;

Fig. 2 is a similar view showing the sinker released and just dropping off the device;

Fig. 3 is a side view of the device;

Fig. 4 is a sectional view through the head of the device on the line 4—4, Fig. 3;

Fig. 5 is a sectional view through the head of the device with the blades attached thereto; and Fig. 6 is a side view of Fig. 5.

Referring to the drawing, 1 designates an ordinary fish line, 2 a fish hook leader, 3 the sinker or weight, and 4 the cord thereof, all of which parts are connected with the device A, which constitutes the subject matter of the invention.

The device A comprises a head 5 which is fitted in the hollow body or casing 6 as a plug with a considerable portion projecting out of the top. Attached to the upper end of the head is a swivel 8, to which the fish line 1 is connected. Extending longitudinally of the body 6 and guided in the apertured bottom 7 is a follower 9 having at its lower end a swivel 10 disposed outside the body, and the upper end of this follower slides in a central bore 11 in the head 5, there being a shoulder 12 on the follower which engages the bottom or inner end of the head by virtue of the tension of a spring 13 located in the body 6 with its upper and lower ends bearing respectively on the shoulder 12 and the bottom 7 of the body 6. This spring serves as a shock absorber when the fish bites, so that the line, rod and leader will be protected and the fish's mouth will not be torn, it being understood that a pull on the hook or leader will cause the spring to be compressed, as shown in Fig. 2, whereby a yielding resistance is afforded to take up the shock.

The head 5 has a transverse passage 14, and the upper end of the follower extends across this passage so as to constitute a locking bolt for holding the loop 15 on the sinker cord 4. It will thus be seen that the sinker is detachably connected with the fish line so that when the follower is pulled downwardly under the weight or resistance of the fish, the sinker will be released from the fish line, which will permit the angler to have perfect freedom in playing and manipulating the fish. By suspending the sinker from the fish line by means of the device A, the hook or hooks are protected from catching on the bottom, the sinker riding freely on the bottom. The weight or sinker cord is to be at least two or three feet longer than the leader, so that when the sinker is suspended from the device A the sinker will occupy a position of travel far below the hook, and thus the sinker acts as a bumper and serves as a signal to the angler when the hook is in danger of becoming entangled on the bottom without the fish line or leader becoming kinked or twisted, because of the swivel connection between the device A with the fish line and leader.

The passage 14 in the head 5 has another function, in that the spinner blades B can be detachably applied to the device. This passage, as shown in Fig. 3, is of angular form, which feature is utilized for holding the blades B at a proper pitch. Each blade has spring-attaching members or hooks 16, and these are engaged in the corners of the passage 14 in the head, one member 16 of each blade being engaged in an upper corner at one side of the opening 14 and the other member of the same blade being engaged in the lower corner at the opposite side, the blades being inserted in the head from opposite points. It will thus be seen that the blades are independently attached to the head and held in the proper position because the pair of attaching members of each blade tend to spring apart or are normally under tension, which effectively tends to hold them firmly in the corners of the opening in the head. When both blades are used the device operates as a high speed spinner, but when only one blade is used the device has a zig-zag motion and revolves irregularly and at a lower speed. When spinner blades are used the fish hook is preferably attached to the tail swivel 10.

From the foregoing description taken in connection with the accompanying drawing the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of a fish line, a rotatable body connected therewith, a bait holder having a swivel connection with the body, and a sinker connected with the said body and automatically released therefrom by a pull on the bait holder.

2. The combination of a fish line, a device rotatably connected therewith, a spring-opposed yielding member on the device, a bait holder connected with the member, and a sinker detachably connected with the device by the said member.

3. The combination of a fish-line, a device connected therewith and having an opening, a yielding member mounted on the device and extending across the opening, a bait holder connected with the member, and a sinker cord extending into the opening and detachably connected with the device by the said member.

4. The combination of a fish-line, a bait holder, a sinker, and means connecting the sinker with the line and bait holder to release the sinker when a fish exerts a pull on the line by being caught by the holder.

WILLIS FOREST DARLING.